United States Patent
Patil et al.

(10) Patent No.: US 9,038,722 B2
(45) Date of Patent: May 26, 2015

(54) CEMENT COMPOSITIONS CONTAINING METPHOSPHATE AND METHODS OF USE

(71) Applicant: Halliburton Energy Services, Inc., Houston, TX (US)

(72) Inventors: Rahul Chandrakant Patil, Pune (IN); Sandip Prabhakar Patil, Pune (IN); Sohini Bose, Pune (IN); Ashok K. Santra, The Woodlands, TX (US); Balasundaram Balaraman, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

(21) Appl. No.: 13/909,232

(22) Filed: Jun. 4, 2013

(65) Prior Publication Data

US 2014/0102704 A1   Apr. 17, 2014

Related U.S. Application Data

(62) Division of application No. 13/651,699, filed on Oct. 15, 2012, now abandoned.

(51) Int. Cl.
| | |
|---|---|
| *E21B 33/13* | (2006.01) |
| *C04B 28/04* | (2006.01) |
| *C04B 28/08* | (2006.01) |
| *C09K 8/467* | (2006.01) |
| *C09K 8/48* | (2006.01) |
| *C04B 103/00* | (2006.01) |
| *C04B 111/00* | (2006.01) |
| *C04B 111/10* | (2006.01) |

(52) U.S. Cl.
CPC .................. *E21B 33/13* (2013.01); *C04B 28/04* (2013.01); *C04B 28/08* (2013.01); *C09K 8/467* (2013.01); *C09K 8/48* (2013.01); *C04B 2103/0035* (2013.01); *C04B 2111/00215* (2013.01); *C04B 2111/10* (2013.01)

(58) Field of Classification Search
CPC ........ C09B 14/062; C04B 14/30; E21B 33/13
USPC .................. 166/292, 293, 285, 294
See application file for complete search history.

(56) References Cited

U.S. PATENT DOCUMENTS

| | | | |
|---|---|---|---|
| 2,233,973 A | 3/1941 | Dunn | |
| 4,028,125 A | 6/1977 | Martin | |
| 4,784,693 A * | 11/1988 | Kirkland et al. | 106/730 |
| 5,301,754 A * | 4/1994 | Cowan et al. | 166/295 |
| 5,316,083 A * | 5/1994 | Nahm et al. | 166/291 |
| 5,361,841 A * | 11/1994 | Hale et al. | 166/293 |
| 5,366,547 A | 11/1994 | Brabston et al. | |
| 5,411,092 A | 5/1995 | Cowan | |
| 5,900,053 A | 5/1999 | Brothers et al. | |
| 6,143,069 A | 11/2000 | Brothers et al. | |
| 6,332,921 B1 | 12/2001 | Brothers et al. | |
| 6,488,763 B2 | 12/2002 | Brothers et al. | |
| 6,626,242 B2 * | 9/2003 | D'Almeida et al. | 166/292 |
| 6,796,378 B2 | 9/2004 | Reddy et al. | |
| 6,846,357 B2 | 1/2005 | Reddy et al. | |
| 6,904,971 B2 | 6/2005 | Brothers et al. | |
| 7,147,055 B2 | 12/2006 | Brothers et al. | |
| 7,255,739 B2 | 8/2007 | Brothers et al. | |
| 7,337,842 B2 | 3/2008 | Roddy et al. | |
| 7,381,263 B2 | 6/2008 | Roddy et al. | |
| 7,390,356 B2 | 6/2008 | Kulakofsky et al. | |
| 7,398,827 B2 | 7/2008 | Kulakofsky et al. | |
| 7,404,440 B2 | 7/2008 | Reddy et al. | |
| 7,409,991 B2 | 8/2008 | Reddy et al. | |
| 7,451,817 B2 | 11/2008 | Reddy et al. | |
| 7,863,224 B2 | 1/2011 | Keys et al. | |
| 2007/0221100 A1 | 9/2007 | Kumar et al. | |
| 2010/0240556 A1 | 9/2010 | Keys et al. | |
| 2010/0270016 A1 | 10/2010 | Carelli et al. | |
| 2012/0090845 A1 | 4/2012 | Huang et al. | |

OTHER PUBLICATIONS

"Ground Granulated Blast-Furnace Slag as a Cementitious Constituent in Concrete," Reported by ACI Committee 233, American Concrete Institute, ACT 233R-95, 2000, pp. 233R-1-233R-18.

Steven H. Kosmatka, William C. Pararese, "Design and Control of Concrete Mixtures," Thirteenth Edition, Engineering Bulletin, Portland Cement Association, ISBN 0-89312-087-1, 1988, 3 pages.

Brian Berard, Rafael Hernandez, Hao Nguyen, "Foamed Calcium Aluminate Phosphate Cement Enables Drilling and Cementation of California Geothermal Wells," SPE 120845, 2009 SPE Western Regional Meeting, San Jose California, Mar. 24-28, 2009, 6 pages.

* cited by examiner

*Primary Examiner* — Zakiya W Bates
*Assistant Examiner* — Silvana Runyan
(74) *Attorney, Agent, or Firm* — Craig W. Roddy; Baker Botts L.L.P.

(57) ABSTRACT

In an embodiment, the cement compositions comprise: (i) hydraulic cement, wherein the hydraulic cement has a ratio of CaO to SiO2 in the range of 2.0 to 4.0; and (ii) a water-soluble metaphosphate in a concentration of at least 2.5% bwoc. In another embodiment, the cement compositions comprise: (i) hydraulic cement, wherein the hydraulic cement has a ratio of CaO to $SiO_2$ of less than 2.0; and (ii) a water-soluble metaphosphate; wherein any alkali nitrate is in a concentration of less than 2% bwoc; and wherein any alkali hydroxide, alkali carbonate, or alkali citrate is in a concentration of less than 0.2% bwoc. Methods of cementing in a well comprising forming either of such cement compositions and introducing it into the well are provided.

8 Claims, No Drawings

CEMENT COMPOSITIONS CONTAINING METPHOSPHATE AND METHODS OF USE

CROSS-REFERENCE TO RELATED APPLICATIONS

This is a divisional of U.S. application Ser. No. 13/651,699 filed on Oct. 15, 2012, entitled "CEMENT COMPOSITIONS CONTAINING METAPHOSPHATE AND METHODS OF USE".

TECHNICAL FIELD

The inventions are in the field of producing crude oil or natural gas from subterranean formations. More specifically, the inventions generally relate to cement compositions and methods for cementing wells.

BACKGROUND

To produce oil or gas, a well is drilled into a subterranean formation that is an oil or gas reservoir.

Generally, well services include a wide variety of operations that may be performed in oil, gas, geothermal, or water wells, such as drilling, cementing, completion, and intervention. Well services are designed to facilitate or enhance the production of desirable fluids, such as oil or gas, from or through a subterranean formation. A well service usually involves introducing a well fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well. Workover can broadly refer to any kind of well intervention that involves invasive techniques, such as wireline, coiled tubing, or snubbing. More specifically, however, workover usually refers to a process of pulling and replacing a completion.

Cementing and Hydraulic Cement Compositions

In a cementing operation, a hydraulic cement, water, and other components are mixed to form a hydraulic cement composition in fluid form. The hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The hydraulic cement composition should be a fluid for a sufficient time before setting to allow for pumping the composition into the wellbore and for placement in a desired downhole location in the well. The cement composition is allowed time to set in the annular space, thereby forming an annular sheath of hardened, substantially impermeable cement. The hardened cement supports and positions the pipe string in the wellbore and fills the annular space between the exterior surfaces of the pipe string and the borehole of the wellbore.

It is important to maintain a cement in a pumpable slurry state until it is placed in a desired portion of the well. For this purpose, a set retarder can be used in a cement slurry, which retards the setting process and provides adequate pumping time to place the cement slurry. Alternatively or in addition, a set intensifier can be used, which accelerates the setting process. The use of retarder or intensifier can be used to help control the thickening time or setting of a cement composition.

SUMMARY OF THE INVENTION

In an embodiment, a cement composition includes: (i) hydraulic cement, wherein the hydraulic cement has a ratio of CaO to $SiO_2$ in the range of 2.0 to 4.0; and (ii) a water-soluble metaphosphate in a concentration of at least 2.5% bwoc.

In another embodiment, a cement composition includes: (i) hydraulic cement, wherein the hydraulic cement has a ratio of CaO to $SiO_2$ of less than 2.0; and (ii) a water-soluble metaphosphate; wherein any alkali nitrate is in a concentration of less than 2% bwoc; and wherein any alkali hydroxide, alkali carbonate, or alkali citrate is in a concentration of less than 0.2% bwoc.

Methods of cementing in a well include forming either of such cement compositions and introducing it into the well.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, oil and gas are understood to refer to crude oil and natural gas.

Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Terms

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introduced at least into and through the wellhead. According to various techniques known in the art, tubulars, equipment, tools, or well fluids can be directed from the wellhead into any desired portion of the wellbore.

As used herein, the word "tubular" means any kind of body in the form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location.

As used herein, the term "annulus" means the space between two generally cylindrical objects, one inside the other, where fluid can flow. The objects can be concentric or eccentric. One of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the wellbore and the outside of a tubing string is an annulus. In a cased hole, the space between the wellbore and the outside of the casing is an annulus. In addition, in a cased hole, there may be an annulus between the tubing string and the inside of the casing.

As used herein, a "well fluid" broadly refers to any fluid adapted to be introduced into a well for any purpose. A well fluid can be, for example, a drilling fluid, a cementing composition, a treatment fluid, or a spacer fluid.

A zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular well fluid or stage of a well service. For example, a fluid can be designed to have components that provide a minimum viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment at the time of a well treatment. That is, design temperature takes into account not only the bottom hole static temperature ("BHST"), but also the effect of the temperature of the well fluid on the BHST during treatment. The design temperature is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

Physical States and Phases

The common physical states of matter include solid, liquid, and gas. A solid has a fixed shape and volume, a liquid has a fixed volume and conforms to the shape of a container, and a gas disperses and conforms to the shape of a container. Distinctions among these physical states are based on differences in intermolecular attractions. Solid is the state in which intermolecular attractions keep the molecules in fixed spatial relationships. Liquid is the state in which intermolecular attractions keep molecules in proximity (low tendency to disperse), but do not keep the molecules in fixed relationships. Gas is that state in which the molecules are comparatively separated and intermolecular attractions have relatively little effect on their respective motions (high tendency to disperse).

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, unless the context otherwise requires, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles in a solid or liquid state (which means such an association of a few atoms or molecules). As used herein, a particulate is a grouping of particles having similar chemical composition and particle size ranges anywhere in the range of about 1 micrometer (e.g., microscopic clay or silt particles) to about 3 millimeters (e.g., large grains of sand).

A particulate will have a particle size distribution ("PSD"). As used herein, "the size" of a particulate can be determined by methods known to persons skilled in the art.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Particulates smaller than about 400 U.S. Standard Mesh are usually measured or separated according to other methods because small forces such as electrostatic forces can interfere with separating tiny particulate sizes using a wire mesh.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified different ways, including, for example, based on the size of the dispersed particles, the uniformity or lack of uniformity of the dispersion, and, if a fluid, whether or not precipitation occurs, among other criteria.

Solubility

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a single phase or a dispersion. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a well fluid is a liquid under Standard Laboratory Conditions. For example, a well fluid can be in the form of be a suspension (solid particles dispersed in a liquid phase), an emulsion (liquid particles dispersed in another liquid phase), or a foam (a gas phase dispersed in a liquid phase).

Permeability

Permeability refers to how easily a fluid can flow through a material. For example, if the permeability is high, then a fluid will flow more easily and more quickly through the material. If the permeability is low, then a fluid will flow less easily and more slowly through the material. As used herein, "high permeability" means the material has a permeability of at least 100 millidarcy (mD). As used herein, "low permeability" means the material has a permeability of less than 1 mD.

Cement Compositions

In the most general sense of the word, a "cement" is a binder, that is, a substance that sets and can bind other materials together. As used herein, "cement" refers to inorganic cement (as opposed to organic cement and adhesives). When the cement is mixed with water, it will begin to set and harden into a concrete material.

As used herein, a "cement composition" is a material including at least cement. A cement composition can also include additives. A cement composition can include water or be mixed with water. Depending on the type of cement, the chemical proportions, a cement composition with can begin setting to form a concrete material.

A cement can be characterized as non-hydraulic or hydraulic.

Non-hydraulic cements (e.g., gypsum plaster, Sorel cements) must be kept dry in order to retain their strength. A non-hydraulic cement produces hydrates that are not resistant to water. If the proportion of water to a non-hydraulic cement is too high, the cement composition will never set into a hardened material.

For example, gypsum plaster ($CaSO_4 \cdot \frac{1}{2}H_2O$) is produced by heating gypsum ($CaSO_4 \cdot 2H_2O$) to about 300° F. (150° C.), releasing water (as steam). When the dry plaster powder is mixed with water, it re-forms into gypsum. The setting of unmodified plaster normally starts about 10 minutes after mixing and is complete in about 45 minutes; but not fully set for 72 hours. If plaster or gypsum is heated above about 392° F. (about 200° C.), anhydrite is formed, which will also re-form as gypsum if mixed with water. A large gypsum deposit at Montmartre in Paris led gypsum plaster to be commonly known as "plaster of Paris." Gypsum is moderately water-soluble (about 2.0 to about 2.5 g/l at 25° C.), but, in contrast to most other salts, it exhibits a retrograde solubility, becoming less soluble at higher temperatures.

Hydraulic cements (e.g., Portland cement) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water. The cement composition sets by a hydration process, and it passes through a gel phase to solid phase.

Portland cement is a hydraulic cement produced by pulverizing Portland cement clinker, usually but not always containing added calcium sulfate (gypsum) as calcium sulfate dehydrate ($CaSO_4 \cdot 2H_2O$). More particularly, for example, Portland cement is formed from a clinker such as a clinker according to the European Standard EN197-1: "Portland cement clinker is a hydraulic material which shall consist of at least two-thirds by mass of calcium silicates ($3CaO \cdot SiO_2$ and $2CaO \cdot SiO_2$), the remainder consisting of aluminum- and iron-containing clinker phases and other compounds. The ratio of CaO to $SiO_2$ shall not be less than 2.0. The magnesium oxide content (MgO) shall not exceed 5.0% by mass." The American Society of Testing Materials ("ASTM") standard "C 150" defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." In addition, Portland cements typically have a ratio of CaO to $SiO_2$ of less than 4.0.

Clinkers are nodules (diameters about 0.2 inch to about 1.0 inch [about 5 mm to about 25 mm]) of a sintered material that is produced when a raw mixture of predetermined composition is heated to high temperature.

Portland cement clinker is made by heating to sintering temperature a mixture of raw materials, which is about 1450° C. for modern cements. The major raw material is usually limestone ($CaCO_3$) mixed with a second material containing a source of alumino-silicate (usually clay). The alumina and iron oxide are present as a flux and contribute little to the strength.

As a side-product in Portland cement clinker, tricalcium aluminate occurs as an "interstitial phase," crystallizing from the melt. For example, pure tricalcium aluminate is formed when the appropriate proportions of finely divided calcium oxide and aluminum oxide are heated together above 1300° C. Its presence in clinker is solely due to the need to obtain liquid at the peak kiln processing temperature (1400-1450° C.), facilitating the formation of the desired silicate phases. Apart from this benefit, its effects on cement properties are mostly undesirable.

For example, tricalcium aluminate reacts most strongly with water of all the calcium aluminates, and it is also the most reactive of the Portland clinker phases. Its hydration to phases of the form $Ca_2AlO_3(OH) \cdot nH_2O$ leads to the phenomenon of "flash set" (instantaneous set), and a large amount of heat is generated. To avoid this flash set, Portland-type cements include a small addition of gypsum (calcium sulfate), typically in the range of about 4% to 8% by weight of the cement). Sulfate ions in solution lead to the formation of an insoluble layer of ettringite ($3CaO \cdot Al_2O_3 \cdot 3CaSO_4 \cdot 32H_2O$) over the surface of the aluminate crystals, passivating them. The aluminate then reacts slowly to form the AFm phase $3CaO \cdot Al_2O_3 \cdot CaSO_4 \cdot 12H_2O$. These hydrates contribute little to strength development.

In addition, tricalcium aluminate is associated with three important effects that can reduce the durability of concrete: (a) Heat release, which can cause spontaneous overheating in large masses of concrete. Where necessary, tricalcium aluminate levels are reduced to control this effect. (b) Sulfate attack, in which sulfate solutions to which the concrete is exposed react with the AFm phase to form ettringite. This reaction is expansive, and can disrupt mature concrete. Where concrete is to be placed in contact with, for example, sulfate-laden ground waters, either a "sulfate-resisting" cement (with low levels of tricalcium aluminate) is used, or slag is added to the cement or to the concrete mix. The slag contributes sufficient aluminium to suppress formation of ettringite. (c) Delayed ettringite formation, where concrete is cured at temperatures above the decomposition temperature of ettringite (about 65° C.). On cooling, expansive ettringite formation takes place.

For special cements, such as Low Heat (LH) and Sulfate Resistant (SR) types, it is necessary to limit the amount of tricalcium aluminate ($3CaO \cdot Al_2O_3$ or $Ca_3Al_2O_6$) formed.

An impure limestone that contains some clay or $SiO_2$ may be used in making Portland cement. The $CaCO_3$ content of such limestones can be as low as 80%. Second raw materials (materials in the raw mix other than limestone) depend on the purity of the limestone. Some of the second raw materials used are clay, shale, sand, iron ore, bauxite, fly ash, and slag. When a cement kiln is fired by coal, the ash of the coal can be a secondary raw material.

The American Society for Testing and Materials (ASTM) has established a set of standards for a Portland cement to meet to be considered an ASTM cement. These standards include Types I, II, III, IV, and V.

The American Petroleum Institute (API) has established a set of standards that a Portland cement must meet to be considered an API cement. The standards include Classes A, B, C, D, E, F, G, H, I, and J.

Slag cement (also known as ground granulated blast-furnace slag or "GGBFS", is a hydraulic cement having a low CaO cement. Slag cement typically has a ratio of CaO to $SiO_2$ that is less than 2.0, and preferably greater than 0.5.

A blended cement is a hydraulic cement produced by intergrinding Portland cement clinker with other materials, by blending Portland cement with other materials, or by a combination of intergrinding and blending.

Fly ash is made from burned coal and a common additive in cement compositions. POZMIX™ pozzolanic cement additive is a fly ash made from burned coal. This additive helps lighten the slurry and enhance its pumping properties. This additive can be used at bottomhole temperatures (BHTs) between 80° F. and 550° F. (27° C. to 288° C.). Typical hydraulic cement slurries with POZMIX™ additive are 50/50 blends of POZMIX™ additive and hydraulic cement. POZMIX™ additive is compatible with all classes of hydraulic cement. It also reacts with lime to produce a cement-like material. MICRO FLY ASH™ pozzolanic cement additive is a fly ash with a particle size from 3 micrometers to 9 micrometers. MICRO FLY ASH™ pozzolanic cement additive is commercially available from Halliburton Energy Services, Inc. in Duncan, Okla.

Another common additive is silica (silica dioxide). Silica is commonly added as a strength-stabilizing agent for the set cement. SSA-1™ agent (also called silica flour) is a powdered sand that helps oilwell cement maintain low permeability and high compressive strength under high-temperature conditions. SSA-1™ agent is recommended for use in cementing wells where static temperatures exceed 230° F. Above this temperature, most cement compositions exhibit satisfactory compressive strength after the initial set but will rapidly lose strength after continued exposure to high temperatures. SSA-1™ agent helps prevent this problem by chemically reacting with the cement at high temperatures. SSA-1™ agent has been widely used in thermal recovery wells in combination with refractory-type cements. SSA-1™ agent is mined and processed in the following two forms: (a) in a minus 200-mesh powder for maximum reactivity in cement concentrations of normal weight; and (b) in a selected particle-gradation design for densified cements where increased weights and maximum reactivity are required.

Other Cement Additives

Cement compositions can contain other additives, including but not limited to resins, latex, stabilizers, silica, microspheres, aqueous superabsorbers, viscosifying agents, suspending agents, dispersing agents, salts, accelerants, surfactants, retarders, defoamers, high-density materials, low-density materials, fluid loss control agents, elastomers, vitrified shale, gas migration control additives, formation conditioning agents, or other additives or modifying agents, or combinations thereof.

An example of an additive is a high-density additive. As used herein, a "high-density" additive is an additive that has a density greater than 3 g/cm$^3$. Some metal oxides can be used as a high-density additive. As used herein, a "metal oxide" is a metal cation or transition metal cation with an oxide anion. Examples of metal oxides include, but are not limited to, iron oxide ($Fe_2O_3$) and manganese oxide ($Mn_3O_4$). A commercially available example of an iron oxide high-density additive is HI-DENSE™ and an example of a commercially available manganese oxide is MICROMAX™, both available from Halliburton Energy Services, Inc. in Duncan, Okla.

For example, Micromax™ weight additive increases slurry density with hausmannite ore ground to an average particle size of 5 microns. Unlike most weighting materials, Micromax™ weight additive remains in suspension when added directly to mixing water. Micromax™ weight additive can be used at bottomhole circulating temperatures between 80° F. and 500° F. (27° C. to 260° C.). In deep wells with high temperatures and pressures, Micromax™ weight additive can help restrain formation pressures and improve mud displacement. Additive concentrations depend on the slurry weight designed for individual wells. Because of the fine-ground ore in Micromax™ weight additive, higher concentrations of retarders might be required to achieve the thickening times provided by other types of weight additives. Slurries of cement compositions containing Micromax™ weight additive might also require the addition of dispersants. Micromax™ weight additive is commercially available from Halliburton Energy Services, Inc. in Duncan, Okla.

Cementing

During well completion, it is common to introduce a cement composition into an annulus in the wellbore. For example, in a cased hole, the cement composition is placed into and allowed to set in the annulus between the wellbore and the casing in order to stabilize and secure the casing in the wellbore. After setting, the set cement composition should have a low permeability. Consequently, oil or gas can be produced in a controlled manner by directing the flow of oil or gas through the casing and into the wellhead. Cement compositions can also be used, for example, in well-plugging operations or gravel-packing operations.

During cementing operations, it is necessary for the cement composition to remain pumpable during introduction into the subterranean formation or the well and until the cement composition is situated in the portion of the subterranean formation or the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the cement composition to set.

As used herein, a "retarder" is a chemical agent used to increase the thickening time of a hydraulic cement composition. The need for retarding the thickening time of a cement composition tends to increase with depth of the zone to be cemented due to the greater time required to complete the cementing operation and the effect of increased temperature on the setting of the cement. A longer thickening time at the design temperature allows for a longer pumping time that may be required.

Pumping Time

As used herein, the "pumping time" is the total time required for pumping a hydraulic cementing composition into a desired portion or zone of the well in a cementing operation plus a safety factor.

Thickening Time

As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc.

As used herein, the consistency of a cement composition is measured according to ANSI/API Recommended Practice 10B-2 as follows. The cement composition is mixed and then placed in the test cell of a High-Temperature, High-Pressure (HTHP) consistometer, such as a Fann Model 275 or a Chandler Model 8240. The cement composition is tested in the HTHP consistometer at the specified temperature and pressure. Consistency measurements are taken continuously until the consistency of the cement composition exceeds 70 Bc.

Of course, the thickening time should be greater than the pumping time for a cementing operation.

Setting and Compressive Strength

As used herein, the term "set" is intended to mean the process of becoming hard or solid by curing. Depending on the composition and the conditions, it can take just a few minutes up to 72 hours or longer for some cement compositions to initially set. A cement composition sample that is at least initially set is suitable for destructive compressive strength testing. Some cement compositions can continue to develop a compressive strength greater than 50 psi over the course of several days. The compressive strength of certain kinds of cement compositions can reach over 10,000 psi.

The compressive strength of a cement composition can be used to indicate whether the cement composition has set. As used herein, a cement composition is considered "initially set" when the cement composition has developed a compressive strength of 50 psi using the non-destructive compressive strength method. As used herein, the "initial setting time" is the difference in time between when the cement is added to the water and when the cement composition is initially set. If not otherwise stated, the setting and the initial setting time is determined at a temperature of 212° F. and a pressure of 3,000 psi.

Compressive strength is generally measured at a specified time after the cement composition has been mixed and at a specified temperature and pressure. For example, compressive strength can be measured at a time in the range of about 24 to about 48 hours at a temperature of 212° F. According to ANSI/API Recommended Practice 10B-2, compressive strength can be measured by either a destructive method or non-destructive method.

The destructive method mechanically tests the strength of cement composition samples at various points in time by crushing the samples in a compression-testing machine. The destructive method is performed as follows. The cement composition is mixed and then cured. The cured cement composition sample is placed in a compressive strength testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression device. The actual compressive strength is reported in units of pressure, such as pound-force per square inch (psi) or megapascals (MPa).

The non-destructive method continually measures a correlated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The cement composition is mixed. The cement composition is placed in an Ultrasonic Cement Analyzer, in which the cement composition is heated to the specified temperature and pressurized to the specified pressure. The UCA continually measures the transit time of the acoustic signal through the sample. The UCA device contains preset algorithms that correlate transit time through the sample to compressive strength. The UCA reports the compressive strength of the cement composition in units of pressure, such as psi or megapascal (MPa).

After the cement composition has set in the portion of the well to be cemented, the composition preferably has a low permeability.

Cement Testing Conditions

As used herein, if any test (e.g., thickening time, compressive strength, or permeability) requires the step of "mixing the cement composition," then the mixing step is performed according to ANSI/API Recommended Practice 10B-2 as follows. Any of the ingredients that are a dry substance and a dispersant are pre-blended. The liquid is added to a mixing container and the container is then placed on a mixer base. For example, the mixer can be a Lightning Mixer. The motor of the base is then turned on and maintained at about 4,000 revolutions per minute (rpm). The cement and any other pre-blended dry ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed under Standard Laboratory Conditions (about 77° F. and about 1 atmosphere pressure).

It is also to be understood that if any test (e.g., thickening time, compressive strength, or permeability) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 77° F. and then placed into the testing apparatus and the temperature of the cement composition can be ramped up to the specified temperature. As used herein, the rate of ramping up the temperature is in the range of about 3° F./min to about 5° F./min. After the cement composition is ramped up to the specified temperature and possibly pressure, the cement composition is maintained at that temperature and pressure for the duration of the testing.

As used herein, if any test (e.g., compressive strength or permeability) requires the step of "curing the cement composition," then the curing step is performed according to ANSI/API Recommended Practice 10B-2 as follows. After the cement composition has been mixed, it is poured into a curing mold. The curing mold is placed into a pressurized curing chamber and the curing chamber is maintained at a temperature of 212° F. and a pressure of 3000 psi. The cement composition is allowed to cure for the length of time necessary for the composition to set. After the composition has set, the curing mold is placed into a water cooling bath until the cement composition sample is tested.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

Unless otherwise specified or unless the context otherwise clearly requires, the phrase "by weight of cement" ("bwoc") means the weight of the dry hydraulic cement without the weight of any water or additives.

If there is any difference between U.S. or Imperial units, U.S. units are intended.

Unless otherwise stated, mesh sizes are in U.S. Standard Mesh.

General Objectives

To cater to a global demand operators are ready to explore oil reservoirs which are rather complex. Cost is also an important factor while drilling such wells, and to minimize rig cost operators often want less wait on cement time. Designing cement slurries for deepwater wells is often a challenge, especially when the bottom hole or design temperature is in the range of about 100° F. to about 170° F. The main problem in designing such slurries is to get reasonable thickening time with development of early compressive strength (time require to attain 50 psi). In most of the slurries, the time difference between 70 Bc in thickening time to developing 50 psi compressive strength is large enough to often result in undesirably long waiting on cement ("WOC") times. For example, it is possible to get thickening time around 5 hours, but the setting to a compressive strength of at least 50 psi can take 15 hours or more.

To address this problem of waiting on cement, we tested sodium hexametaphosphate ("SHMP"). We found that adding SHMP helps control thickening time and reduces the time required to obtain 50 psi compressive strength. Shorter WOC are very desirable for economic reason especially on offshore rigs.

According to an embodiment of the invention, a cement composition includes: (i) hydraulic cement, wherein the hydraulic cement has a ratio of CaO to $SiO_2$ in the range of 2.0 to 4.0; and (ii) a water-soluble metaphosphate in a concentration of at least 2.5% bwoc.

According to an embodiment of the invention, a cement composition includes: (i) hydraulic cement, wherein the hydraulic cement has a ratio of CaO to $SiO_2$ of less than 2.0; and (ii) a water-soluble metaphosphate; wherein any alkali nitrate is in a concentration of less than 2% bwoc; and wherein any alkali hydroxide, alkali carbonate, or alkali citrate is in a concentration of less than 0.2% bwoc. In preferred embodiments, the ratio of CaO to $SiO_2$ is at least 0.5.

In further embodiments, a cement composition according to the inventions can include, for example, Portland cement, slag cement, fly ash, pumice, zeolite, and any combination thereof.

In some embodiments of the inventions, the metaphosphate is in a concentration of less than 10% bwoc.

In some embodiments, the metaphosphate can be selected from the group consisting of an alkali metal metaphosphate, an ammonium metaphosphate, and any combination thereof.

In some embodiments of the inventions, the metaphosphate is or comprises a hexametaphosphate. In an embodiment, the hexametaphosphate is selected from the group consisting of alkali metal hexametaphosphate, ammonium hexametaphosphate, and any combination thereof. In a presently preferred embodiment, the hexametaphosphate is sodium hexametaphosphate ("SHMP"). According to a presently preferred embodiment, the hexametaphosphate is in a concentration of at least 2.5% bwoc. More preferably, the hexametaphosphate is in a concentration of less than 10% bwoc.

In these ranges, a metaphosphate is not used as a gelling control agent, but rather as an accelerator to help shorten the time between thickening and setting to a compressive strength of at least 50 psi at the design temperature. In such concentration ranges, the SHMP does not significantly alter the rheology of the cement composition.

Preferably, in an embodiment of the invention, any alkali nitrate in the cement composition is in a concentration of less than 2% bwoc. More preferably, the cement composition is substantially free of alkali nitrate. This provides the advantages of a nitrate free cement composition.

Preferably, in an embodiment of the invention, any alkali hydroxide, alkali carbonate, or alkali citrate is in a concentration of less than 0.2% bwoc, separately or in combined concentration. More preferably, the cement composition is substantially free of any of these.

In some embodiments, a cement composition according to the inventions has less than 15% by weight of calcium aluminoferrite.

In some embodiments, a cement composition according to the inventions additionally includes at least a sufficient concentration of water relative to the hydraulic cement to cause the cement to harden and set.

According to another embodiment of the invention, a method of cementing a treatment zone of a well is provided, the method including the steps of: (A) forming a cement composition according to any of the embodiments described above and with water; and (B) introducing the cement composition into the well.

According to an embodiment of the method, the design temperature of the treatment zone is in the range of 100° F. to 170° F.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing.

Often the step of delivering a well fluid into a well is within a relatively short period after forming the well fluid, e.g., within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

In an embodiment, the cement composition is allowed to thicken and set in the well. In an embodiment, the step of flowing back is within 10 hours of the step of introducing. In another embodiment, the step of flowing back is within 5 hours of the step of introducing.

Preferably, after such cementing, a step of producing hydrocarbon from the subterranean formation is performed.

Examples

To facilitate a better understanding of the present invention, the following examples of certain aspects of some embodiments are given. In no way should the following examples be read to limit, or define, the entire scope of the invention.

An example of a cement composition for a similar slag cement compositions with an without SHMP is shown in Table 1. In the slurry formula without SHMP, the thickening time (hr:mn) at 145° F. and 11,000 psi atmospheric was 5 hours and 40 minutes, whereas with the addition of SHMP to a similar formula, the thickening time was 8 hours and 3 minutes. The longer thickening time can be desirable for allowing longer pumping time. However, the slag slurry formula without SHMP required 23 hours and 33 minutes to develop 50 psi UCA compressive strength at 165° F. and 3,000 psi atmospheric. At 24 hours, the slag slurry formula without SHMP had developed a compressive strength of only 78 psi under those conditions. With the addition of 5% bwoc SHMP, the similar slag slurry formula required only 7 hours and 13 minutes to develop 50 psi UCA compressive strength at 165° F. and 3,000 psi atmospheric. At 24 hours, the similar slag slurry formula with added SHMP had developed a compressive strength of 1113 psi under those conditions. While the formulas providing adequate thickening times, partly due to the lignosulfonate retarder, the addition of SHMP to the formula greatly reduces the waiting on cement time. Whereas, if too much lignosulfoate retarder is used without the SHMP, the cement may never set at all.

TABLE 1

| 15.7 ppg Slag Cement Slurry | Slurry without SHMP | Slurry with SHMP |
| --- | --- | --- |
| Slag Cement (bwoc) | 100 | 100 |
| POZMIX A ™ fly ash (% bwoc) | 40 | 40 |
| SSA-1 (% bwoc) | 20 | 20 |
| MICROMAX ™ weight additive (MnO) (% bwoc) | 40 | 40 |
| Elastomer (styrene butadiene) (% bwoc) | 20 | 20 |
| Dispersant (naphthalene sulfonate condensate) (% bwoc) | 1.4 | 1.4 |
| Fluid Loss additive (Copolymer of AMPS) (% bwoc) | 0.8 | 0.8 |
| Retarder (Lignosulfonate) (gal/sk) | 0.06 | 0.86 |
| Defoamer (Polydimethyl siloxane) (gal/sack) | 0.10 | 0.1 |
| SHMP (% bwoc) | None | 5.0 |
| Water (% bwoc) | 43 | 38.9 |
| Thickening Time (hr:mn) at 145° F. and 11,000 psi atmospheric | 5:40 | 8:03 |
| Time (hr:min) for 50 psi UCA compressive strength at 165° F. and 3,000 psi atmospheric | 23:33 | 7:13 |
| 24 hour UCA compressive strength (psi) at 165° F. and 3,000 psi atmospheric | 78 | 1113 |

An example of a cement composition for a slag cement blend is shown in Table 2. Slurry showed thickening time ("TT") of 4 hours at 165° F., but no strength was developed until 19 hours at that temperature. To achieve a shorter time for developing compressive strength, SHMP included in a cement composition for a slag cement is shown in Table 2. Addition of SHMP at a concentration of 5% bwoc gave a thickening time (TT) close to 6 hrs, and 50 psi strength also developed within 10:28 hr:min at 165° F.

TABLE 2

| 15.8 ppg Slag Cement Slurry | Slurry without SHMP | Slurry with SHMP |
| --- | --- | --- |
| Water (% bwoc) | 75.97 | 78.56 |
| Slag Cement (% bwoc) | 100 | 100 |
| POZMIX ™ fly ash (% bwoc) | 20 | 40 |
| SSA-1 ™ Silica Flour (% bwoc) | 20 | 20 |
| MICROMAX ™ weight additive (MnO) (% bwoc) | 40 | 40 |
| Elastomer (styrene butadiene) (% bwoc) | 20 | 20 |
| MICRO FLY ASH ™ pozzolanic cement additive (% bwoc) | 20 | None |
| Surfactant (Alkyl phenoxy ether sulfate, sodium salt) (gal/sack) | 0.6 | None |
| Defoamer (Polydimethyl siloxane) (gal/sack) | 0.1 | 0.1 |
| Dispersant (naphthalene sulfonate condensate) (% bwoc) | 4 | 1.4 |
| SHMP (% bwoc) | None | 5 |
| Fluid Loss additive (Copolymer of AMPS) (% bwoc) | 0.8 | 0.8 |
| Viscosifier (amphoteric copolymer of AMPS) (% bwoc) | 2 | None |
| Retarder (lignosulfonate) (gal/sack) | None | 0.86 |
| Thickening Time (hr:min) at 3,000 psi atmospheric | 4:06 (at 165° F.) | 6:30 (at 145° F.) |
| 50 psi UCA compressive strength at 165° F. and 3,000 psi atmospheric (hr:min) | No strength until 19 hours | 10:28 |

The effect of SHMP on low density slurry of 13.5 ppg slag cement blend is presented in Table 3. From Table 3, it can be seen that a slag cement composition without SHMP does not develop compressive strength until 21 hours even though the thickening time was 4 hours at 165° F. By addition of 4% of SHMP to such a cement composition, the strength development starts at 6:42 (hrs:min), although thickening time (TT) has been reduced to 3:12 hr:min. It is important to note here that without addition of SHMP, most of the retarders were insensitive towards thickening time (TT). However, by adding SHMP and increasing retarder concentration, thickening time (TT) was found to be increased to 5:20 hr:min. The time required to obtain 50 psi also proportionally increased.

TABLE 3

| 13.5 ppg Slag Cement Slurry | Slurry without SHMP | Slurry with SHMP | Slurry with SHMP and increased Retarder |
| --- | --- | --- | --- |
| Water (% bwoc) | 93.26 | 108.8 | 108.2 |
| Slag Cement (% bwoc) | 100 | 100 | 100 |
| POZMIX ™ fly ash (% bwoc) | 52.5 | 40 | 40 |
| SSA-1 ™ silica flour (% bwoc) | 37.5 | 19 | 19 |
| Elastomer (styrene butadiene) (% bwoc) | 40 | 16 | 16 |
| Gel Breaker | None | 0.47 | 0.47 |
| Defoamer (Polydimethyl siloxane) (gal/sack) | 0.12 | 0.08 | 0.08 |
| Dispersant (naphthalene sulfonate condensate) (% bwoc) | 1.0 | None | None |
| SHMP (% bwoc) | None | 4 | 4 |
| Fluid Loss additive (Copolymer of AMPS) (% bwoc) | None | 3.8 | 3.8 |
| Fluid Loss additive (acrylamide copolymer) (% bwoc) | 1.0 | 1.1 | 1.1 |
| Retarder (copolymer of acrylic acid) (% bwoc) | 1.1 | 0.52 | None |
| Retarder (lignosulfonate) (gal/sack) | None | None | 0.66 |
| SILICALITE ™ cement additive (finely divided, high surface-area amorphous silica) (% bwoc) | 20 | 32 | 32 |
| Thickening Time at 145° F. and 11,000 psi (hr:min) | 4:14 | 3:20 | 5:20 |
| 50 psi UCA compressive strength at 165° F. and 3,000 psi (hr:min) | No strength till 21 hours | 6:42 | 13:50 |

Another example of a cement composition for a Class G Portland cement blend is shown in Table 4. Slurry showed thickening time ("TT") of 6:52 hours at 145° F., but a 50 psi UCA compressive strength required 22:48 hr:min, and the compressive strength was only 221 psi at 24 hours at that temperature. To achieve a shorter time for developing compressive strength, SHMP included in a cement composition shown in Table 4. Addition of SHMP at a concentration of 2.5% bwoc gave a thickening time (TT) of 5:21 hrs:min at 145 F, a 50 psi UCA compressive strength within 4:25 hrs:min, and a 24 hour compressive strength of 1847 psi at that temperature.

TABLE 4

| 15.8 ppg Portland Cement Slurry | Slurry without SHMP | Slurry with SHMP |
|---|---|---|
| Class G Cement (% bwoc) | 100 | 100 |
| POZMIX ™ fly ash (% bwoc) | 10 | 10 |
| Fluid Loss Additive (HALAD 862 ™) (% bwoc) | 2.0 | 2.0 |
| Retarder (lignosulphonate) (gal/sack) | 0.09 | 0.09 |
| SHMP (% bwoc) | None | 2.5 |
| Defoamer (Polydimethyl siloxane) (gal/sack) | 0.05 | 0.05 |
| Water (% bwoc) | 46.56 | 46.56 |
| Thickening Time at 145° F. and 11,000 psi (hr:min) | 6:52 | 5:21 |
| 50 psi UCA compressive strength at 165° F. and 3,000 psi (hr:min) | 22:48 | 4:25 |
| 24 hour UCA compressive strength at 165° F. and 3,000 psi | 221 | 1847 |

The above examples show that SHMP helps control waiting on cement (WOC) times without disturbing retarder effectiveness for thickening times. It will also help in reducing WOC by developing initial strength more rapidly.

Conclusion

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of cementing a treatment zone of a well, the method comprising the steps of:
    (A) forming a cement composition comprising:
        (i) hydraulic cement, wherein the hydraulic cement has a ratio of CaO to $SiO_2$ in the range of 2.0 to 4.0;
        (ii) a water-soluble metaphosphate in a concentration of at least 2.5% bwoc; and
        (iii) water; and
    (B) introducing the cement composition into the well.

2. The method according to claim 1, wherein the metaphosphate comprises a hexametaphosphate.

3. The method according to claim 1, wherein the metaphosphate is selected from the group consisting of an alkali metal metaphosphate, an ammonium metaphosphate, and any combination thereof.

4. The method according to claim 1, wherein the metaphosphate is in a concentration of less than 10% bwoc.

5. The method according to claim 1, wherein any alkali nitrate is in a concentration of less than 2% bwoc.

6. The method according to claim 1, wherein any alkali hydroxide, alkali carbonate, or alkali citrate is in a concentration of less than 0.2% bwoc.

7. The method according to claim 1, wherein any calcium aluminoferrite is in a concentration of less than 15% bwoc.

8. The method according to claim 1, wherein the design temperature is in the range of 100° F. to 170° F.

* * * * *